Nov. 18, 1947.   R. G. BROWN   2,431,107
SAFETY RELEASE CLUTCH
Filed Jan. 12, 1946   2 Sheets-Sheet 1

Inventor
Rush G. Brown

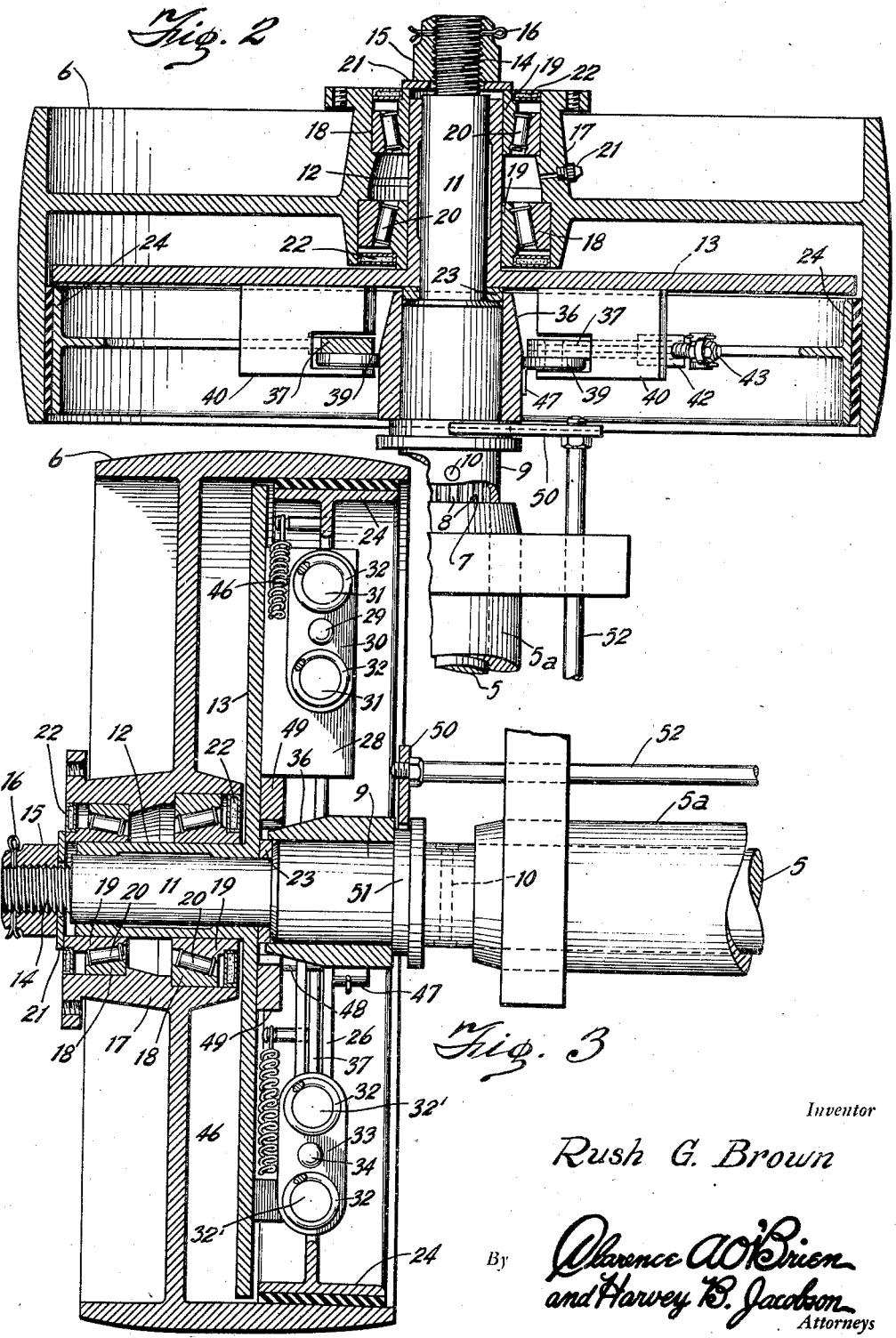

Patented Nov. 18, 1947

2,431,107

UNITED STATES PATENT OFFICE 2,431,107

SAFETY RELEASE CLUTCH

Rush G. Brown, Riverton, Wyo.

Application January 12, 1946, Serial No. 640,767

6 Claims. (Cl. 192—56)

This application is a continuation, in part, of my co-pending application for U. S. Letters Patent, Serial No. 558,177, filed October 11, 1944, upon Reciprocating saw machine.

The present invention relates to improvements in clutches of the type embodying internal expanding clutch shoes, and wherein the shoes are expanded by mechanical means and contracted or released by springs.

An important object of the invention is to provide a clutch of the above kind which is comparatively simple and durable in construction, and highly efficient in operation.

Another important object is to provide a clutch of the above kind wherein means is provided to automatically contract and release the clutch shoes so as to free the body of the clutch from a driven shaft on which it is journaled, when rotation of said shaft is resisted to a predetermined extent by an excessive load.

The present invention consists in the novel form, combination and arrangement of parts hereinafter more fully described, shown in the accompanying drawings and claimed.

In the drawings:

Figure 1 is a view partly in vertical section and partly in side elevation, of a clutch constructed in accordance with the present invention and having a body in the form of a power transmitting pulley.

Figure 2 is a view partly in plan and partly in section on line 2—2 of Figure 1.

Figure 3 is a view partly in elevation and partly in section on line 3—3 of Figure 1.

Figure 4 is a fragmentary section taken on line 4—4 of Figure 1.

Referring in detail to the drawings, 5 indicates a driven shaft journaled in a torque tube 5a, and 6 a pulley which is suitably driven and which is journaled on the shaft 5, novel means being provided in accordance with the present invention for releasably clutching the pulley 6 to the shaft 5 for driving the latter.

As shown clearly in Figures 2 and 3, an end portion of the shaft 5 has a part 7 thereof reduced and provided with longitudinal keys 8 which are received in internal grooves of a sleeve 9 so that said sleeve is splined on said part 7 of the shaft. Sleeve 9 is secured in place by a rivet 10 which passes through said sleeve and the shaft part 7 and has heads countersunk in the surface of the sleeve 9 as indicated by dotted lines in Figure 3. The end portion of shaft 5 has another part 11 which is reduced still further and which has accurately fitted and journaled thereon a sleeve 12 forming the hub of a disc 13. The terminal part 14 of the end portion of shaft 5 is still further reduced and threaded to receive a nut 15 which is locked in adjusted position on the shaft part 14 by a cotter pin 16. The pulley 6 is provided with a hub 17 in which are fitted the outer conical races 18 of a pair of roller bearings which also include inner races 19 fitted on the sleeve 12, and bearing rollers 20 interposed between the races 18 and 19. The inner race 19 of one bearing projects beyond an end of the shaft part 11 about the adjacent portion of the shaft part 14. This projecting race 19 is engaged by a washer 21 loosely placed on the shaft part 14 between said race and the nut 15. Consequently, adjustment of nut 19 effects adjustment of the adjacent race 19 so as to shift the pulley 6 and the outer races 18 and thereby avoid any unnecessary play in the bearings. It will be noted that the bearings are spaced apart so as to provide a chamber in the hub 17 between them for the reception of grease, the hub being provided with a grease gun fitting 22 to facilitate introduction of grease in this chamber for lubricating the bearings. Escape of lubricant from the hub 17 is prevented by means of grease retainers 22 fitted in the ends of the hub 17 and on the outer ends of the races 19. A thrust washer 23 is fitted on the shaft part 11 between the adjacent end of sleeve 9 and the disc 13.

The rim of pulley 6 preferably has a crowned outer surface and is extended at one side to form the drum of the clutch. The disc 13 is arranged within the rim of the pulley 6 at one end of its hub 17 or between the hub 17 and the sleeve 9. Arranged at the inner side of disc 13 adjacent the periphery of the latter and in position to engage the inner surface of the rim of pulley 6 are clutch shoes 24 which are connected at corresponding ends to the disc 13 by links 25. Sleeve 9 forms the hub of a driving spider or cross-bar having oppositely projecting arms 26, each of which is composed of a pair of spaced rigidly connected members. Turning movement of the spider in one direction relative to disc 13 is limited by stop blocks 27 fixed to and projecting laterally from the disc 13. Fixed to disc 13 at the sides of spider arms 26 opposite those at which the blocks 27 are located, are angle brackets 28. Bolted at 29 to the brackets 28 are bearing plates 30 that are adjustable radially of the pulley and which have spaced studs 31 receiving the ends of helical compression springs 32. The springs 32 are interposed between the brackets 28 and the spider arms 26, and the other ends of these springs are received by studs 32' of radially adjustable bearing plates 33 similar to the bearing plates 30 but bolted at 34 to the spider arms 26. The radial adjustment of bearing plates 30 and 33 will of course effect corresponding adjustment of the springs 32 so as to vary, within limits, the leverage obtained by the action of springs 32 against the spider arms 26. At their outer ends, the spider arms 26 are provided with lugs 35 disposed to contact the stop blocks 27. Obviously, for light service, one spring 32 of each pair may be removed or eliminated. The purpose of the springs 32 is to yieldingly resist turning movement of the spider in the direction wherein the arms 26 move away from the stop blocks 27. In this way, the springs 25 provide a yielding driving connection between the spider and the disc 13 and they are retained in place by the studs 31 and 32'.

Slidable on the sleeve or hub 9 of the spider is an actuating cone 36 for pivoted clutch shoe operating levers 37 whose outer shorter arms are pivoted at 38 to the free ends of the clutch shoes 24. The longer arms of levers 37 carry at their inner ends rollers 39 that bear upon opposite sides of the cone 36 and are guided in brackets 40 secured to the inner side of disc 13. The pivots 41 of levers 37 are carried by disc 13 so as to be adjustable in a manner to provide adjustment of the clutch shoes relative to the drum or rim of pulley 6. For this purpose, the pivots 41 are carried by clevises 42 having threaded stems 43 which freely pass through ears 44 carried by and projecting laterally from the disc 13, jamb nuts 45 being threaded on the stem 43 against opposite sides of the ears 44 to secure the adjustment.

Helical tension springs 46 connect the inner longer arms of levers 37 with the respective shoes 24 and act to normally yieldingly release said shoes. However, movement of cone 26 toward disc 13 causes actuation of levers 37 in a direction to apply the shoes 24 or engage them with the clutch drum or rim of pulley 6. As shown more clearly in Figure 4, the cone 36 is slotted to straddle the arms 26 at opposite sides of the spider sleeve or hub 9. Rigid with and projecting outwardly from opposite sides of the cone 36 are lugs 47 which carry pins 48 that are slidable through the spider arms 26 and have beveled inner ends. Fixed to disc 13 are cam plates 49 which are arranged in the path of the pins 48. Thus, should rotation of shaft 5 be resisted to an extent sufficient to cause compression of springs 32, disc 13 will be caused to turn with pulley 15 by the previously applied shoes 24, and cam plates 49 will ride under the pins 48 so as to cause movement of the cone 36 away from disc 13. This shifts the tapered part of cone 36 toward the plane of rollers 39, thereby permitting swinging of levers 37 by springs 46 in a direction to release the shoes 24 and permit free turning of the pulley 6 relative to shaft 5. A simple and efficient safety release clutch is thus provided between the pulley 6 and shaft 5.

In order that the driving connection between pulley 6 and shaft 5 may be manually released, the cone 26 has a shifting fork 50 engaged in a groove 51 thereof, and said fork 50 is provided with an operating rod 52 suitably adapted for manual actuation at a desired point. When the cone 36 is actuated by rod 52 so as to be moved toward the disc 13, the levers 37 will be actuated by said cone to apply the shoes 24.

From the foregoing description, it is believed that the construction, operation and advantages of the present invention will be readily understood and appreciated by those skilled in the art. Minor changes may be made in details of construction, such as fall within the scope of the invention as claimed.

What I claim is:

1. A clutch comprising a driven shaft, a driving drum journaled on said shaft, a supporting member journaled on said shaft within said drum, clutch shoes carried by said supporting member and adapted to engage the inner periphery of said drum, a spider including a hub secured on said shaft and provided with radially extending arms, springs carried by said supporting member and acting on the arms of the spider to yieldingly resist turning of the latter relative to said supporting member in one direction, levers pivoted on said supporting member and pivotally connected to said clutch shoes, springs connected to said levers and acting to disengage the clutch shoes from the drum, a cone slidable on the spider hub and engaged by said levers to actuate the latter for engaging the clutch shoes with the drum when moved toward the supporting member and for allowing the clutch shoes to be disengaged from the drum when moved away from said supporting member, cam plates carried by said supporting member, and pins carried by said cone and engageable by said cam plates for shifting the cone away from said supporting member when the spider is turned relative to the supporting member in one direction.

2. The construction defined in claim 1, wherein said levers are connected to corresponding ends of the clutch shoes, and links connecting the other ends of said clutch shoes with the supporting member.

3. The construction defined in claim 1, wherein said cone is bifurcated to straddle the arms of said spider.

4. The construction defined in claim 1, in combination with stop members carried by said supporting member and arranged in the path of said spider arms to limit turning movement of the supporting member in the opposite direction by the springs acting thereon.

5. The construction defined in claim 1, in combination with abutment plates carried by said supporting member, bearing plates carried by said abutment plates and the arms of the spider and provided with studs, said springs acting on the arms of the spider comprising compression springs having their ends received by the studs of the bearing plates.

6. The construction defined in claim 1, in combination with abutment plates carried by said supporting member, bearing plates carried by said abutment plates and the arms of the spider and provided with studs, said springs acting on the arms of the spider comprising compression springs having their ends received by the studs of the bearing plates, said bearing plates being adjustable radially of the clutch, and means to secure said bearing plates in adjusted position.

RUSH G. BROWN.